UNITED STATES PATENT OFFICE.

LITTLETON LUTHER COLEMAN, OF LAHORE, VIRGINIA.

COMPOUND FOR PAINT MIXTURES.

SPECIFICATION forming part of Letters Patent No. 579,861, dated March 30, 1897.

Application filed May 26, 1896. Serial No. 593,142. (No specimens.)

*To all whom it may concern:*

Be it known that I, LITTLETON LUTHER COLEMAN, a citizen of the United States, residing at Lahore, in the county of Orange and State of Virginia, have invented a new and useful composition of matter consisting of linseed-oil, pine-tar, and alum in about the proportions hereinafter specified, and a process of combining said ingredients so as to cause a perfect amalgamation thereof, all as will be more fully set forth and described in the following specification.

The primary object of my invention is to combine linseed-oil and pine-tar in such manner as to cause a perfect amalgamation thereof and to hold or fix the two oils in solution inseparably, so as to produce an elastic, adhesive, and durable substance adapted to be used as a wood-filler or as a base for paint mixtures.

The invention consists of the improved compound and process of producing the same substantially as will be hereinafter described, and then pointed out in the claims at the end of the description.

My composition consists, essentially, of the following ingredients combined in about the proportions specified, viz: linseed-oil, one-half gallon; pine-tar, one-half gallon, and alum, one-fourth of an ounce. The linseed-oil and pine-tar in about the proportions specified are poured into a suitable vessel and boiled together until they are thoroughly combined or mixed, and while thus boiling the alum is dropped into the mixture, the alum serving to clarify the mixture and to hold the pine-tar in perfect solution in the oil. I thus secure a perfect amalgamation of the two oils and form a mixture or compound that can be produced for less than half the cost of pure linseed-oil and which may be used as the base of all paint mixtures in the place of linseed-oil.

When the compound is to be used for roofing-paint, I add to each gallon of the above mixture four pounds of Venetian red, half pound of red lead, and one gill of Japan varnish, which are thoroughly mixed together and then ground to a thick paste. For other paints I use the same prepared oil or compound with lead, Japan varnish, and such other ingredients as may be desired to obtain the desired coloring.

The uses of the compound will be readily understood by those skilled in the art to which the invention relates. As a wood-filler the compound may be used without any other ingredient, and in the manufacture of paints of various kinds it is intended as the base of the paint mixture with such additional ingredients to give body or color thereto as may be desired.

It may be desirable in some cases if it be not convenient to procure alum to use as a substitute therefor bicarbonate of soda, which may be used in about the proportions of one-half ounce of bicarbonate of soda to each gallon of the other two ingredients combined in equal proportions.

Having thus fully described my invention, what I claim as new, and desire to secure by Letters Patent of the United States, is—

1. The herein-described composition of matter to be used in the manufacture of paints or as a wood-filler, consisting of linseed-oil, pine-tar and alum, combined in about the proportions specified.

2. As a base for a paint mixture, the composition of matter substantially as hereinbefore described, consisting of linseed-oil and pine-tar boiled together with the addition of alum to the boiled mixture, all combined in about the proportions specified.

3. The process of combining linseed-oil and pine-tar so as to cause a perfect amalgamation thereof, which consists in boiling the oil and tar together until they are thoroughly combined or mixed, and in adding to the boiling mixture a small quantity of alum, for the purpose of clarifying the mixture and holding the tar in perfect solution in the oil, substantially as described.

4. A roofing-paint consisting of linseed-oil, pine-tar and alum, as a base, combined with Venetian red, red lead, and Japan varnish, in about the proportions specified.

In testimony whereof I affix my signature in presence of two witnesses.

LITTLETON LUTHER COLEMAN.

Witnesses:
NANNIE B. FRAZER,
W. S. FRAZER.